(12) United States Patent
Toake

(10) Patent No.: US 10,231,446 B2
(45) Date of Patent: Mar. 19, 2019

(54) DUAL-BEARING REEL

(71) Applicant: Shimano Inc., Sakai, Osaka (JP)

(72) Inventor: Youhei Toake, Sakai (JP)

(*) Notice: Subject to any disclaimer, the term of this patent is extended or adjusted under 35 U.S.C. 154(b) by 134 days.

(21) Appl. No.: 15/435,798

(22) Filed: Feb. 17, 2017

(65) Prior Publication Data
US 2017/0339935 A1 Nov. 30, 2017

(30) Foreign Application Priority Data

May 24, 2016 (JP) ................. 2016-103301

(51) Int. Cl.
*A01K 89/01* (2006.01)
*A01K 89/0155* (2006.01)
*A01K 89/015* (2006.01)
*A01K 89/033* (2006.01)

(52) U.S. Cl.
CPC .. *A01K 89/01555* (2013.01); *A01K 89/01931* (2015.05); *A01K 89/056* (2015.05)

(58) Field of Classification Search
CPC ............ A01K 89/015; A01K 89/01555; A01K 89/01931; A01K 89/03
See application file for complete search history.

(56) References Cited

U.S. PATENT DOCUMENTS

| 4,561,605 A * | 12/1985 | Nakajima | A01K 89/01555 188/267 |
| 4,580,742 A * | 4/1986 | Moosberg | A01K 89/01555 242/288 |
| 4,601,439 A * | 7/1986 | Moosberg | A01K 89/01555 242/288 |
| 4,830,308 A * | 5/1989 | Puryear | A01K 89/01555 242/288 |
| 5,273,235 A * | 12/1993 | Sato | A01K 89/01555 242/288 |
| 5,692,693 A * | 12/1997 | Yamaguchi | A01K 89/01555 242/288 |
| 5,749,534 A * | 5/1998 | Morimoto | A01K 89/01555 188/164 |
| 5,875,986 A * | 3/1999 | Miyazaki | A01K 89/0155 242/261 |
| 5,996,920 A * | 12/1999 | Yamaguchi | A01K 89/01557 242/286 |
| 2007/0108330 A1* | 5/2007 | Ikuta | A01K 89/01555 242/288 |
| 2009/0127367 A1* | 5/2009 | Tsutsumi | A01K 89/01555 242/286 |

(Continued)

FOREIGN PATENT DOCUMENTS

JP    2016036308 A    3/2016

*Primary Examiner* — Emmanuel M Marcelo
(74) *Attorney, Agent, or Firm* — United IP Counselors, LLC

(57) ABSTRACT

A dual-bearing reel includes a reel unit, a spool shaft, a spool, and a brake device. The spool shaft is rotatably supported by the reel unit. The spool includes a bobbin trunk, a shaft mount and a coupling wall. The bobbin trunk includes an internal space. The shaft mount has a tubular shape, and is penetrated by the spool shaft. The coupling wall couples the bobbin trunk and the shaft mount. The brake device includes at least one magnet disposed in opposition to the coupling wall. The brake device brakes the spool by a magnetic force applied to the coupling wall from the at least one magnet.

15 Claims, 6 Drawing Sheets

(56) References Cited

U.S. PATENT DOCUMENTS

| | | | |
|---|---|---|---|
| 2009/0166459 A1* | 7/2009 | Niitsuma | A01K 89/01555 242/287 |
| 2013/0037645 A1* | 2/2013 | Niitsuma | A01K 89/01555 242/288 |
| 2013/0292504 A1* | 11/2013 | Hyun | A01K 89/01555 242/289 |
| 2013/0306777 A1* | 11/2013 | Ikebukuro | A01K 89/01555 242/288 |
| 2014/0110516 A1* | 4/2014 | Niitsuma | A01K 89/01555 242/288 |
| 2014/0110517 A1* | 4/2014 | Niitsuma | A01K 89/01555 242/288 |
| 2014/0263792 A1* | 9/2014 | Takechi | A01K 89/015 242/257 |
| 2015/0014460 A1* | 1/2015 | Hyun | A01K 89/0155 242/289 |
| 2015/0090825 A1* | 4/2015 | Ikebukuro | A01K 89/015 242/322 |
| 2016/0015015 A1* | 1/2016 | Niitsuma | A01K 89/01555 242/288 |
| 2016/0037759 A1* | 2/2016 | Ikebukuro | A01K 89/01555 242/288 |

* cited by examiner

DUAL-BEARING REEL

CROSS-REFERENCE TO RELATED APPLICATIONS

This application claims priority to Japanese Patent Application No. 2016-103301 filed on May 24, 2016, the entirety of which is hereby incorporated by reference in its entirety.

BACKGROUND

Technical Field

The present disclosure relates to a dual-bearing reel, and particularly to a dual-bearing reel including a brake device that brakes a spool.

Background Information

In dual-bearing reels, a spool is configured to be rotated when a fishing line is released. When the rotational speed of the spool becomes faster than the releasing speed of the fishing line in casting, so-called backlash occurs, which is a phenomenon that line sag (sag of the fishing line) occurs and results in tangling of the fishing line. When having a large inertia, the spool is not easily rotated when a terminal tackle is thrown. Hence, the terminal tackle cannot fly a long distance. Additionally, when the spool has a large inertia, the rotational speed of the spool does not easily decrease even while applying a braking force to the spool. Hence, backlash is likely to occur. To cope with the drawbacks, a well-known type of dual-bearing reel is designed to reduce the inertia amount of the spool by forming through holes in the bobbin trunk of the spool.

On the other hand, a type of dual-bearing reel has been also provided that includes a brake device configured to apply a braking force to the spool while the spool is rotating. For example, a brake device described in Japan Laid-open Patent Application Publication No. 2016-036308 is capable of applying a braking force to the spool with use of an electromagnetic brake, and is also capable of adjusting the magnitude of the braking force.

In the brake device described in Japan Laid-open Patent Application Publication No. 2016-036308, rotation of the spool is braked with a construction in which magnets, composing part of the electromagnetic brake, are opposed to the inner peripheral surface of the bobbin trunk of the spool. Therefore, when the bobbin trunk is provided with through holes in its parts opposed to the magnets, a sufficient magnitude of braking force is not generated. Incidentally, generally speaking, the bobbin trunk is often thinly formed to reduce the inertia amount of the spool. This construction also has chances that a required amount of a braking force cannot be obtained due to eddy currents that are insufficiently induced.

BRIEF SUMMARY

It is an object of the present disclosure to, in a dual-bearing reel including a brake device that brakes a spool, reduce the inertia amount of the spool, and simultaneously, appropriately apply a braking force to the spool in a manner that the magnitude of the braking force depends on a rotation of the spool.

A dual-bearing reel according to an aspect of the present disclosure includes a reel unit, a spool shaft, a spool and a brake device for braking the spool. The spool shaft is rotatably supported by the reel unit. The spool includes a bobbin trunk, a shaft mount and a coupling wall. The bobbin trunk includes an internal space. The shaft mount has a tubular shape and is penetrated by the spool shaft. The coupling wall couples the bobbin trunk and the shaft mount. The brake device includes at least one magnet disposed in opposition to the coupling wall. The brake device brakes the spool by a magnetic force applied to the coupling wall from the at least one magnet.

The present dual-bearing reel brakes a rotation of the spool with a construction in which the at least one magnet is opposed to the coupling wall coupling the bobbin trunk and the shaft mount. With this construction, the bobbin trunk can be entirely provided with at least one through hole. Hence, it is possible to reduce the inertia amount of the spool as much as possible. Additionally, the coupling wall, having a suitable thickness to enable the spool to keep a preferred strength, can be braked. Hence, it is possible to obtain a sufficient magnitude of braking force.

The brake device can include a magnet attachment member for attaching the at least one magnet.

The magnet attachment member can have a circular-arc shape, can extend in a circumferential direction, and can include a first end and a second end. The second end is movable between a first position and a second position. The second position is located on an outer peripheral side of the first position. The brake device can include a support member and an urging member. The support member supports the first end of the magnet attachment member such that the first end is rotatable. The urging member urges the second end of the magnet attachment member toward the first position.

In this construction, when the rotational speed of the spool becomes faster, a reaction force acts on the magnet attachment member in a manner such that a magnitude of the reaction force depends on the magnitude of the braking force, and the second end of the magnet attachment member is moved to the second position on the outer peripheral side. Accordingly, a magnet part, from which the braking force is generated, is moved to the outer peripheral side. Hence, the braking force is increased.

The coupling wall can include a first lateral surface and a second lateral surface. The first lateral surface is opposed to the at least one magnet. The second lateral surface is disposed on an opposite side of the first lateral surface in an axial direction. The first lateral surface can tilt to get closer to the at least one magnet from an inner peripheral side to the outer peripheral side.

In this construction, when the rotational speed of the spool becomes fast, a reaction force acts on the at least one magnet in a manner that a magnitude of the reaction force depends on the magnitude of the braking force, and the second end of the magnet attachment member is moved to the second position on the outer peripheral side. Accordingly, the magnet part, from which the braking force is generated, is moved to the outer peripheral side. The coupling wall herein tilts to get closer to the at least one magnet to the outer peripheral side. Consequently, when the rotational speed of the spool becomes faster, the braking force is further increased. On the other hand, when the rotational speed of the spool becomes slower, the braking force is reduced. Due to the above, a highly practical brake function can be achieved in that the flying distance in a casting of a terminal tackle can be increased, and simultaneously, an occurrence of line sag attributed to backlash can be inhibited.

The coupling wall can be tapered by tilting both lateral surfaces of the coupling wall to increase a thickness of the coupling wall from an inner peripheral side to an outer peripheral side. Similarly to the above, in this construction, a highly practical braking function can be achieved in that the braking force becomes relatively small when the rotational speed of the spool is slow, whereas the braking force becomes large when the rotational speed of the spool becomes fast.

The support member can be movable in an axial direction of the spool shaft. The brake device can include an adjuster member. The adjuster member moves the support member in the axial direction to adjust a braking force. Accordingly, the braking force can be easily adjusted.

Overall, according to the present disclosure, an inertia amount of the spool can be reduced, and a braking force can be appropriately applied to the spool in a manner such that a magnitude of the braking force depends on a rotation of the spool.

BRIEF DESCRIPTION OF THE DRAWINGS

Referring now to the attached drawings which form a part of this original disclosure.

DETAILED DESCRIPTION OF EMBODIMENTS

<Entire Construction of Dual-Bearing Reel>

Figure 1:
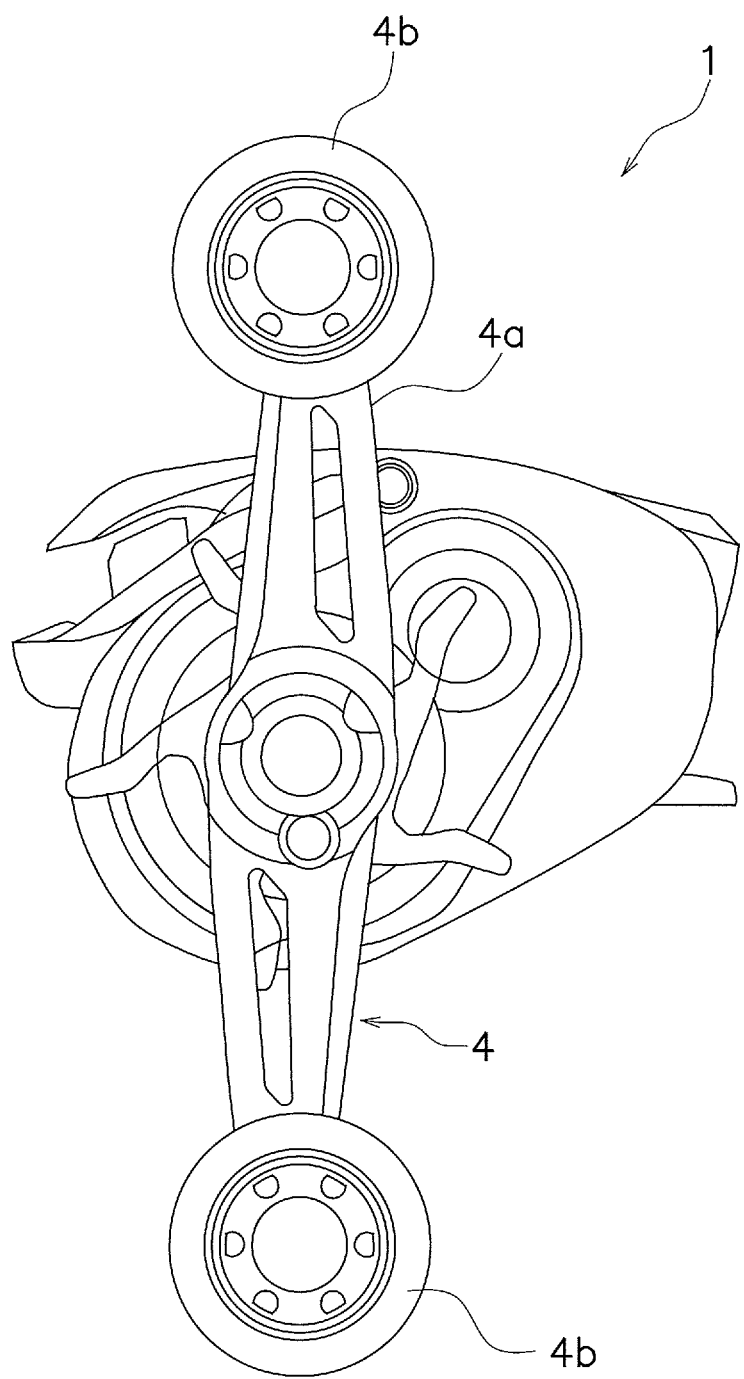
FIG. 1 is a side view of a dual-bearing reel employing a preferred embodiment of the present disclosure.
Figure 2:
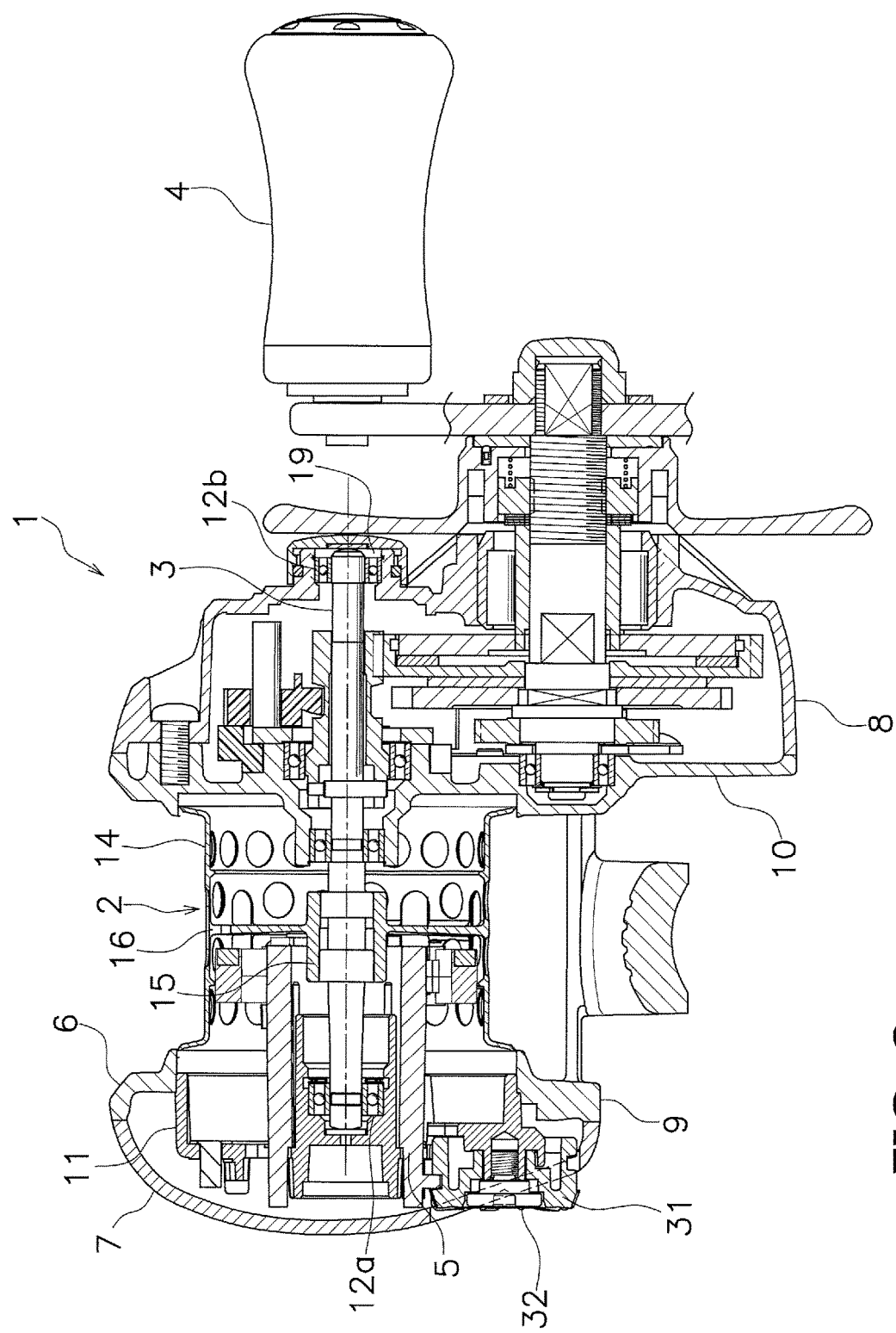
FIG. 2 is a cross-sectional view of the dual-bearing reel employing the preferred embodiment of the present disclosure.

FIG. 1 is a side view of a dual-bearing reel employing a preferred embodiment of the present disclosure, whereas FIG. 2 is a cross-sectional view of the dual-bearing reel. The dual-bearing reel includes a reel unit 1, a spool 2, a spool shaft 3, a handle 4 and a brake device 5. The spool 2 is disposed in the interior of the reel unit 1. The spool shaft 3 is rotatably supported by the reel unit 1. The handle 4 is disposed sideward of the reel unit 1 in order to rotate the spool 2. The brake device 5 brakes a rotation of the spool 2.

As shown in FIGS. 1 and 2, the reel unit 1 includes a frame 6, a first side cover 7, a second side cover 8 and a thumb rest (not shown in the drawings). The first and second side covers 7 and 8 are mounted to both lateral sides of the frame 6. The thumb rest is mounted to an upper part of the frame 6. The frame 6 includes a first side plate 9, a second side plate 10, and a plurality of coupling portions (not shown in the drawings). The first and second side plates 9 and 10 are a pair of side plates disposed in opposition to each other at a predetermined interval. The coupling portions couple the first and second side plates 9 and 10.

Figure 3:
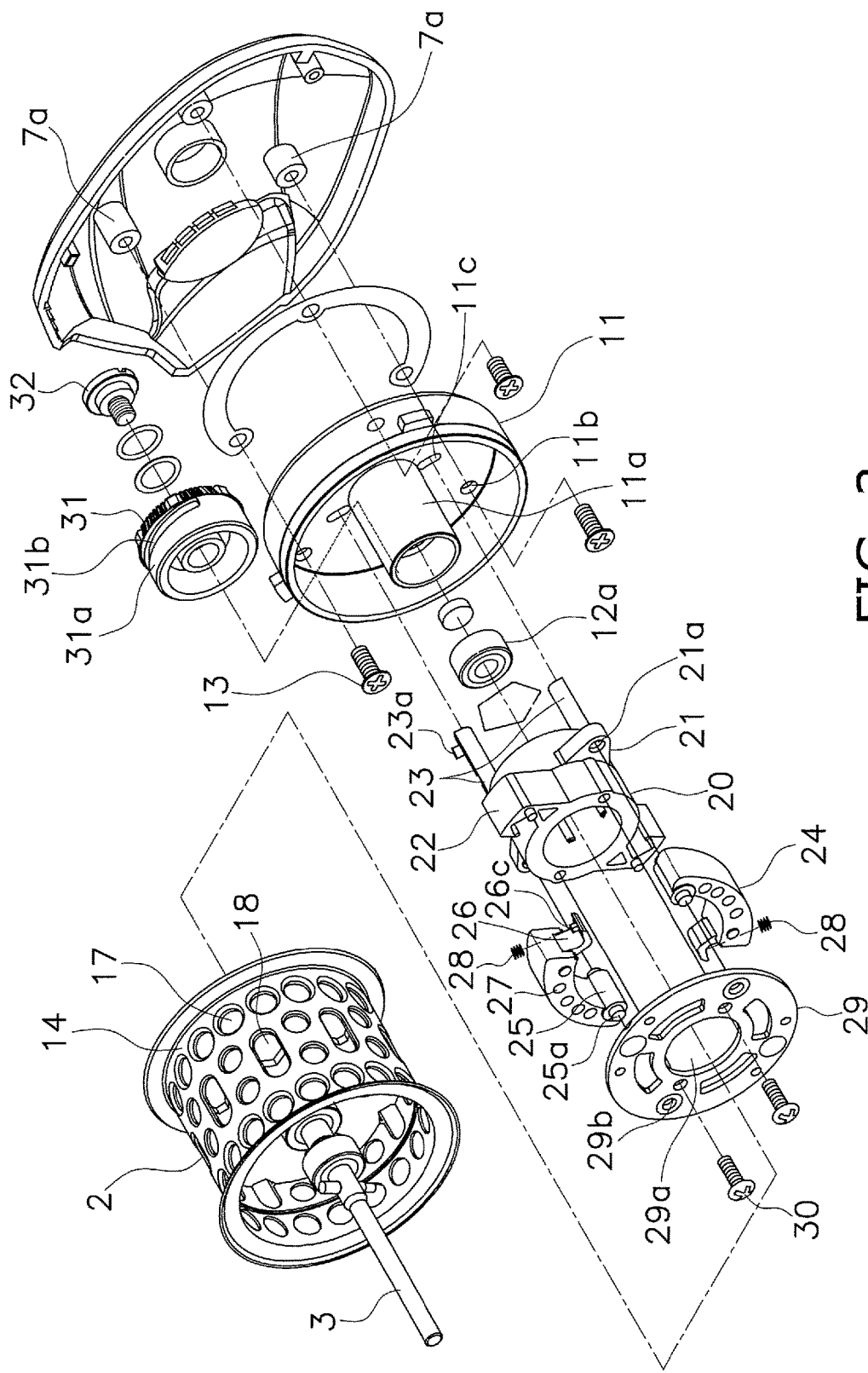
FIG. 3 is an exploded perspective view of the dual-bearing reel including a brake device.

As shown in FIG. 3, the first side cover 7 is provided with a plurality of (e.g., three) fixation bosses 7a on an inner lateral surface of the first side cover 7 in order to fix a shaft support portion 11. The shaft support portion 11 supports one end of the spool shaft 3. The shaft support portion 11 has an approximately cylindrical shape and includes a cylindrical part 11a on a middle part of the shaft support portion 11. The cylindrical part 11a is a part for accommodating the spool shaft 3. The cylindrical part 11a accommodates a bearing 12a by which the one end of the spool shaft 3 is rotatably supported. The brake device 5 is disposed on the inner side (the handle 4 side) of the shaft support portion 11.

Additionally, the bottom surface of the shaft support portion 11 is orthogonal to the spool shaft 3, and is provided with holes 11b and elongated holes 11c. The holes 11b are penetrated by screw members 13 for fixing the shaft support portion 11, respectively. The elongated holes 11c are holes into which engaging parts 23 of a support member 20 (to be described) are inserted.

Figure 4:
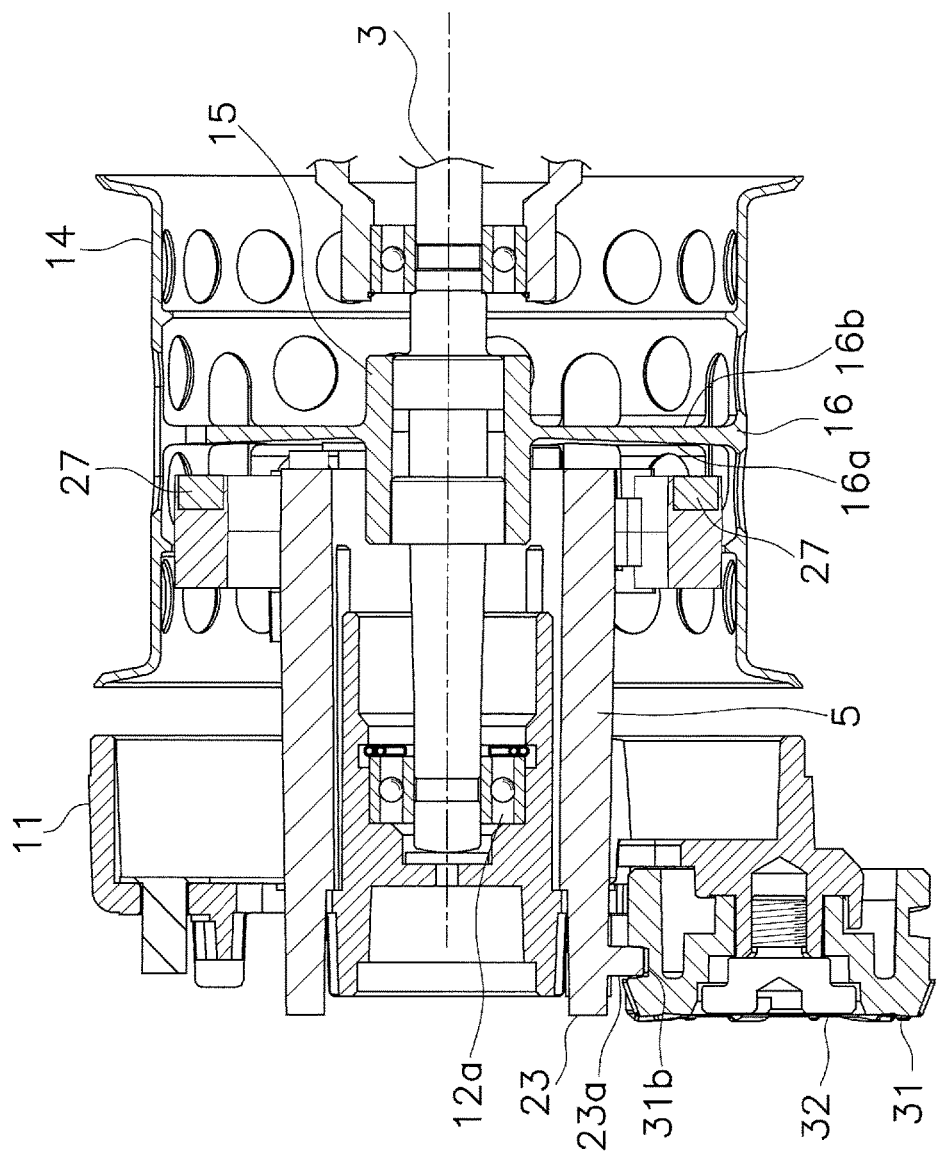
FIG. 4 is an enlarged cross-sectional view of the dual-bearing reel including the brake device.

As shown in FIGS. 2 and 4, the spool 2 includes a bobbin trunk 14, a shaft mount 15 and a coupling wall 16. The bobbin trunk 14 is a tubular part about which the fishing line is wound. The shaft mount 15 is a tubular part to be fixed to the spool shaft 3. The coupling wall 16 couples the bobbin trunk 14 and the shaft mount 15. The coupling wall 16 is an example of a coupling means. The shaft mount 15 and the spool shaft 3 are coupled by, for instance, a serration coupling such that the spool 2 is non-rotatable with respect to the spool shaft 3 penetrating the shaft mount 15. The spool 2 is a non-magnetic electric conductor made of, for instance, an aluminum alloy.

The bobbin trunk 14 is shaped to include a space on an inner peripheral side of the bobbin trunk 14. In addition, as shown in FIG. 3, the bobbin trunk 14 is provided with a plurality of through holes 17 and a plurality of through holes 18 in order to produce the spool 2 with a lightweight construction. The through holes 17 and through holes 18 are examples of weight reducing means. The through holes 17 are provided at predetermined intervals, and each can be made in the shape of a circle. The through holes 18 are provided at predetermined intervals, and each can be made in the shape of an oval or a rectangle with rounded ends.

As shown in FIGS. 2 and 4, the coupling wall 16 couples the bobbin trunk 14 and the shaft mount 15, and can be made in the shape of a disc plate. The coupling wall 16 has a thickness that is thicker on the outer peripheral side than on the inner peripheral side. In more detail, one of the lateral surfaces of the coupling wall 16 (a first lateral surface 16a), opposed to magnets 27 to be described, tilts closer to the magnets 27 on the outer peripheral side than on the inner peripheral side. It should be noted that a second lateral surface 16b, provided on the opposite side of the first lateral surface 16a, is orthogonal to a rotational axis.

The one end of the spool shaft 3 is rotatably supported by the bearing 12a disposed in the shaft support portion 11. The other end of the spool shaft 3 penetrates the second side plate 10 and extends to the outside of the second side cover 8. The other end of the spool shaft 3 is rotatably supported by a boss 19 provided on the second side cover 8 through a bearing 12b.

The handle 4 includes an arm 4a and a pair of knobs 4b. The arm 4a can be made in the shape of a plate. The knobs 4b are rotatably mounted to both ends of the arm 4a.

<Construction of Brake Device 5>

The brake device 5 brakes a rotation of the spool 2 rotatably mounted to the reel unit 1. The brake device 5 is an example of a braking means. As shown in FIG. 3, the brake device 5 includes the support member 20, a pair of magnet attachment members 24, the plural magnets 27, two spring members 28 and a fixation plate 29.

The support member 20 has an approximately cylindrical shape and a center axis of the support member 20 overlaps with the center axis (rotational axis) of the spool shaft 3. The support member 20 covers the outer peripheral side of the cylindrical part 11a of the shaft support portion 11, and is movable in the axial direction. The support member 20 is provided with a pair of protrusions 21 and a pair of holding pawls 22 on an outer peripheral surface of the support member 20. The pair of protrusions 21 is located on opposite sides of the support member 20 and protrude radially outward from the support member 20. Additionally, each protrusion 21 is provided with a hole 21a axially penetrating through each protrusion 21. The pair of holding pawls 22 are located on opposite sides of the support member 20 and radially protrude from the support member 20. Each holding pawl 22 is located circumferentially between the pair of the protrusions 21. The support member 20 further includes the pair of engaging parts 23 extending toward the first side cover 7. The engaging parts 23 are inserted through the elongated holes 11c provided in the shaft support portion 11, respectively. With this construction, the support member 20 is non-rotatable and is movable in the axial direction. It should be noted that one of the engaging parts 23 is provided with a protrusion 23a on the outer peripheral surface of a tip end of the one of the engaging parts 23.

The pair of magnet attachment members 24 is disposed at intervals in the circumferential direction. Each magnet attachment member 24 can be made in the shape of a circular arc extending in the circumferential direction, and includes a support part 25 and an engaging part 26.

The support part 25 is provided on a first lengthwise end of each magnet attachment member 24. The support part 25 includes a pair of columnar protrusions 25a on both axial end surfaces of the support part 25. The protrusions 25a are inserted into the hole 21a provided in each protrusion 21 of the support member 20 and each of through holes 29b provided in the fixation plate 29 to be described, respectively. Accordingly, the magnet attachment members 24 are capable of pivoting between a first position on the inner peripheral side and a second position on the outer peripheral side, and are supported by the support member 20 and the fixation plate 29. The support member 20 is an example of a supporting means.

The engaging part 26 is provided on a second lengthwise end (located on the opposite side from the first lengthwise end) of each magnet attachment member 24. The engaging part 26 is engaged with each holding pawl 22 of the support member 20 so as to restrict the pivot range of each magnet attachment member 24. Additionally, the engaging part 26 is provided with a protrusion 26c to which each spring member 28 is mounted.

Figure 5:
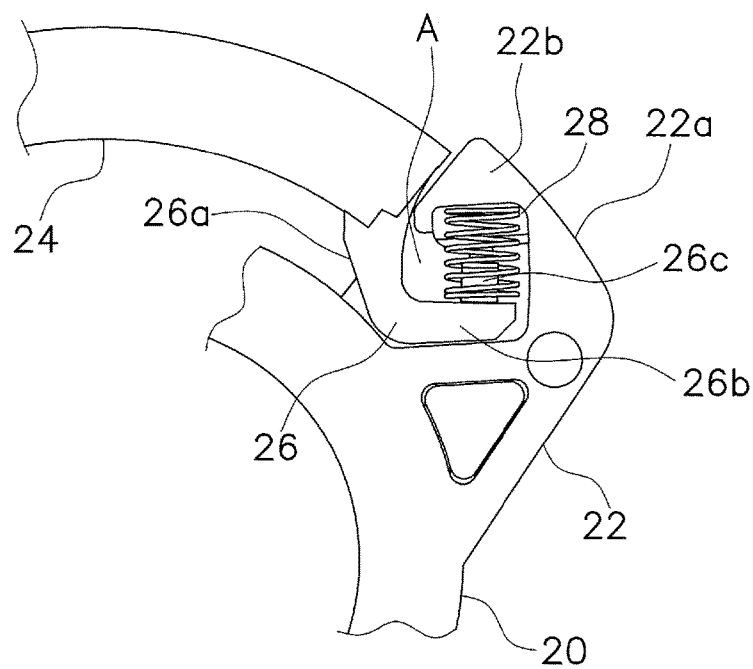
FIG. 5 is a partial enlarged view of the brake device.

Each holding pawl 22 of the support member 20 and the engaging part 26 of each magnet attachment member 24 will be hereinafter explained in detail. As shown in FIG. 5, each holding pawl 22 of the support member 20 includes an outer peripheral part 22a and a stopper 22b. The outer peripheral part 22a extends in the circumferential direction. The stopper 22b extends from the tip end of the outer peripheral part 22a to the inner peripheral side. With this construction, a space A is formed on the inner peripheral side of the outer peripheral part 22a.

On the other hand, the engaging part 26 includes an inner peripheral part 26a and a stopper 26b. The inner peripheral part 26a extends from the second lengthwise end of each magnet attachment member 24. The stopper 26b extends from the tip end of the inner peripheral part 26a to the outer peripheral side. Additionally, the stopper 26b of the engaging part 26 enters the space A formed in each holding pawl 22 of the support member 20, whereby both stoppers 22b and 26b are opposed.

Figure 6:
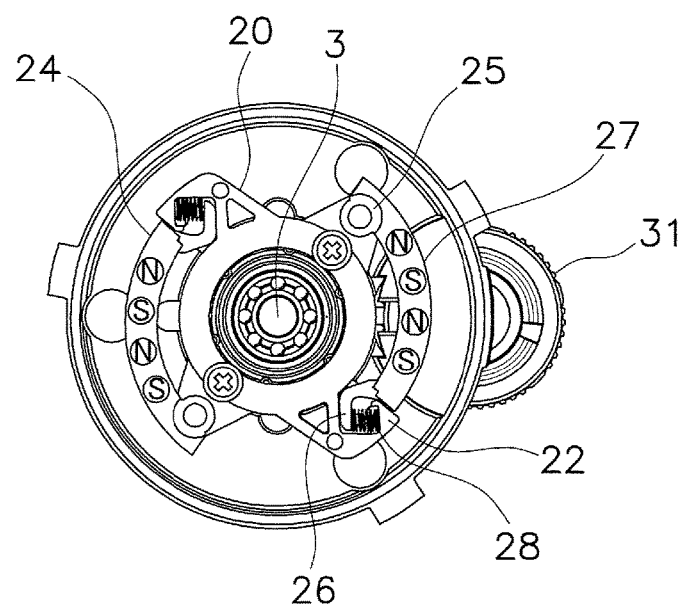
FIG. 6 is a side view of the brake device.
Figure 7:
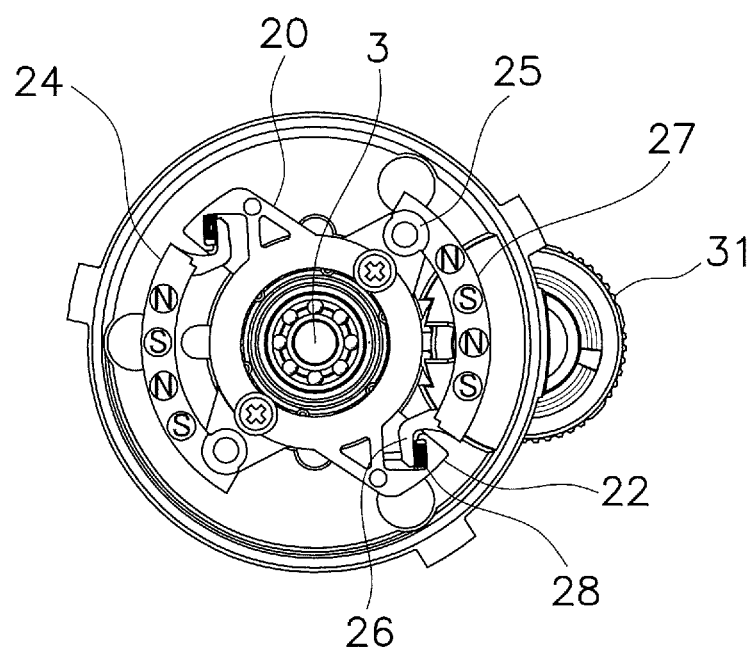
FIG. 7 is a side view of the brake device when a spool is rotated as an exemplary condition.

The plural magnets 27 are fitted and fixed to each magnet attachment member 24. Thus, the plural magnets 27 are integrated with each magnet attachment member 24. The magnet attachment members 24 are examples of an attaching means. As shown in FIGS. 6 and 7, the plural magnets 27 face the coupling wall 16, and are aligned at predetermined intervals in the circumferential direction such that N poles and S poles are alternately disposed.

As shown in FIG. 5, the spring members 28 are coil springs, and each is disposed between the stopper 26b of the engaging part 26 of each magnet attachment member 24 and the stopper 22b of each holding pawl 22 of the support member 20. Additionally, each spring member 28 is supported by the protrusion 26c protruding from the engaging part 26. Each spring member 28 urges the engaging part 26 of each magnet attachment member 24 to the inner peripheral side.

The fixation plate 29 is an approximately circular plate member and includes a through hole 29a and the through holes 29b. The through hole 29a is provided in the middle of the fixation plate 29 and enables the spool shaft 3 to pass through the through hole 29a. The through holes 29b are provided on the outer peripheral part of the fixation plate 29 and are engaged with the protrusions 25a of the magnet attachment members 24, respectively. The fixation plate 29 is fixed to the support member 20 by screw members 30.

<Adjuster Member 31>

An adjuster member 31 is provided for adjusting the braking force of the brake device 5. The adjuster member 31 moves the support member 20 in the axial direction so as to adjust the braking force. As shown in FIG. 3, the adjuster member 31 can be made in the shape of a tube having a partially closed end. Additionally, as shown in FIG. 2, the adjuster member 31 is attached to the shaft support portion 11 by a screw member 32. When seen from the first side cover 7 side, roughly half of the adjuster member 31 is exposed through the first side cover 7. The adjuster member 31 includes a tubular part 31a provided with a helical groove 31b on an outer peripheral surface of the adjuster member 31. As shown in FIG. 4, the helical groove 31b is meshed with the protrusion 23a provided on one of the engaging parts 23 of the support member 20. With this construction, when the adjuster member 31 is rotated in the clockwise direction, the brake device 5 including the support member 20 is moved in a direction approaching to the coupling wall 16. Hence, the braking force is strengthened. Contrarily, when the adjuster member 31 is rotated in the counterclockwise direction, the brake device 5 is moved in a direction separating from the coupling wall 16. Hence, the braking force is weakened. Thus, the braking force can be easily adjusted by the adjuster member 31. The adjuster member 31 is an example of an adjusting means.

<Action of Brake Device 5 in Spool Rotation>

Next, with reference to FIGS. 6 and 7, an action to be performed by the brake device 5 during a casting of the fishing line will be explained. FIG. 6 shows a condition in which the spool 2 is not being rotated, whereas FIG. 7 shows a condition in which the spool 2 is being rotated relatively fast.

When the spool 2 is rotated, eddy currents are induced in the spool 2 by the magnetic flux of the magnets 27 opposed to the coupling wall 16 of the spool 2 as an electric conductor in a manner that a magnitude of the eddy currents depends on the rotational speed of the spool 2. A force, directed oppositely to the rotational direction of the spool 2, is applied to the spool 2 by the eddy currents. Thus, the spool 2 is braked. On the other hand, in a condition in which the spool 2 is being braked by the inducement of eddy currents, a reaction force acts on the magnets 27 in a manner such that a magnitude of the reaction force depends on the magnitude of braking force. When the second lengthwise end (the engaging part 26—side part) of each magnet attachment member 24 is moved to the second position on the outer peripheral side (i.e., the position shown in FIG. 7) by this reaction force, the magnets 27, from which the braking force is generated, are moved to the outer peripheral side. Hence, the braking force is increased. It should be herein noted that during a casting of the fishing line, the coupling wall 16 opposed to the magnets 27 is rotated in a compression direction of the spring members 28.

Moreover, the coupling wall 16 tilts to the outer peripheral side so as to get closer to the magnets 27. In other words, the first lateral surface 16a of the coupling wall 16, opposed to the magnets 27, tilts to the outer peripheral side so as to get closer to the magnets 27. With this construction, the distance between the magnets 27 and the coupling wall 16 is reduced when the magnets 27 are moved toward the second position on the outer peripheral side. Therefore, when the rotational speed of the spool 2 becomes faster, the braking force is further increased. By contrast, when the rotational speed of the spool 2 becomes slower, the braking force is reduced. Due to the above, a highly practical brake function can be achieved in that the flying distance from a casting of a terminal tackle can be increased, and simultaneously, an occurrence of line sag attributed to backlash can be inhibited.

Additionally, the spool 2 is braked by the construction in which the coupling wall 16 and the magnets 27 are opposed to each other. Therefore, the bobbin trunk 14 can be entirely provided with the through holes 17. Therefore, the spool 2 can be produced with a lightweight construction.

It should be noted that in the coupling wall 16, the second lateral surface 16b, located on the opposite side of the first lateral surface 16a in the axial direction, can be made in the shape of a flat surface orthogonal to the axial direction. Therefore, an increase in a thickness of the coupling wall 16 can be avoided, and the spool 2 can be produced with a lightweight construction.

<Other Preferred Embodiments>

(a) In the aforementioned preferred embodiment, the spool 2 has been exemplified as an electric conductor. Alternatively, a metallic vertical wall member fixed to the spool 2 can be used as an electric conductor.

(b) In the aforementioned preferred embodiment, the two magnet attachment members 24 are disposed in the circumferential direction, and each is provided with the four magnets 27. However, the number and the positional arrangement of the magnet attachment members 24 are arbitrarily settable. Moreover, the number and the intervals of the magnets 27 and so forth are arbitrarily settable as well. Furthermore, the alignment of the N and S poles of the magnets 27 is arbitrarily settable as well.

(c) In the aforementioned preferred embodiment, the first lateral surface 16a of the coupling wall 16, opposed to the magnets 27, tilts to get closer to the magnets 27 on the outer peripheral side than on the inner peripheral side. However, the coupling wall 16 can be tapered by both lateral surfaces of the coupling wall 16 tilting to increase the thickness of the coupling wall 16 from the inner peripheral side to the outer peripheral side. Alternatively, the first lateral surface 16a of the coupling wall 16 can be made in the shape of a flat surface orthogonal to the axial direction. Yet alternatively, the second lateral surface 16b can tilt so as to make even the thickness between the first and second lateral surfaces 16a and 16b.

(d) The coupling wall 16 can be provided with at least one suitable through hole. For example, when at least one through hole is provided in a part of the coupling wall 16 unopposed to the magnets 27, the spool 2 can be produced with a further lightweight construction, while the magnitude of the braking force can be maintained at a preferred level.

What is claimed is:

1. A dual-bearing reel, comprising:
   a reel unit;
   a spool shaft rotatably supported by the reel unit;
   a spool including a bobbin trunk, a shaft mount and a coupling wall, the bobbin trunk including an internal space, the shaft mount having a tubular shape, the shaft mount being penetrated by the spool shaft, the coupling wall coupling the bobbin trunk and the shaft mount; and
   a brake device including at least one magnet disposed in opposition to the coupling wall, the brake device configured to brake the spool by a magnetic force applied to the coupling wall from the at least one magnet.

2. The dual-bearing reel according to claim 1, wherein the brake device includes a magnet attachment member for attaching the at least one magnet.

3. The dual-bearing reel according to claim 2, wherein
   the magnet attachment member has a circular-arc shape, the magnet attachment member extending in a circumferential direction, the magnet attachment member including a first end and a second end, the second end movable between a first position and a second position, the second position located towards an outer peripheral side from the first position, and
   the brake device further includes
     a support member supporting the first end of the magnet attachment member such that the first end is rotatable, and
     an urging member urging the second end of the magnet attachment member toward the first position.

4. The dual-bearing reel according to claim 3, wherein
   the support member is movable along an axial direction of the spool shaft, and
   the brake device includes an adjuster member, the adjuster member configured to move the support member in the axial direction and to adjust a braking force.

5. The dual-bearing reel according to claim 3, wherein
   the coupling wall includes a first lateral surface and a second lateral surface, the first lateral surface opposing the at least one magnet, the second lateral surface being on an opposite side of the coupling wall from the first lateral surface in an axial direction,
   the first lateral surface is tilted respective to a rotational axis of the spool, and the first lateral surface tilting such that an outer peripheral portion of the first lateral surface is closer to the at least one magnet than an inner peripheral portion of the first lateral surface.

6. The dual-bearing reel according to claim 5, wherein the coupling wall is tapered by both lateral surfaces of the coupling wall tilting with respect to the rotational axis of the spool, a thickness of the coupling wall increasing from an inner peripheral side of the coupling wall to an outer peripheral side of the coupling wall.

7. The dual-bearing reel according to claim 1, wherein
   the coupling wall includes a first lateral surface and a second lateral surface, the first lateral surface opposing the at least one magnet, the second lateral surface being on an opposite side of the coupling wall from the first lateral surface in an axial direction,
   the first lateral surface is tilted respective to a rotational axis of the spool, and the first lateral surface tilting such that an outer peripheral portion of the first lateral surface is closer to the at least one magnet than an inner peripheral portion of the first lateral surface.

8. The dual-bearing reel according to claim 1, wherein a thickness of the coupling wall is thicker at an outer peripheral portion of the coupling wall than at an inner peripheral portion of the coupling wall.

9. A dual-bearing reel, comprising:
   a spool rotatable about a rotational axis, the spool including a bobbin trunk, a shaft mount, and a coupling wall, the bobbin trunk including an internal space, the shaft mount having a tubular shape, the coupling wall coupling the bobbin trunk and the shaft mount;
   a spool shaft penetrating the shaft mount; and
   a brake device including at least one magnet disposed opposite to a first lateral surface of the coupling wall, the brake device configured to brake the spool by a magnetic force applied to the coupling wall from the at least one magnet, the first lateral surface of the coupling wall being skew to the rotational axis.

10. The dual-bearing reel according to claim 9, wherein the brake device includes a magnet attachment member for attaching the at least one magnet.

11. The dual-bearing reel according to claim 10, wherein the magnet attachment member has a circular-arc shape, the magnet attachment member extending in a circumferential direction about the rotational axis, the magnet attachment member includes a first end and a second end, the second end movable between a first position and a second position, the second position being farther from the rotational axis than the first position, and
   the brake device further includes a support member and an urging member, the support member supporting the first end of the magnet attachment member such that the first end is rotatable, the urging member urging the second end of the magnet attachment member toward the first position.

12. The dual-bearing reel according to claim 11, wherein the support member is movable along the rotational axis, and
   the brake device includes an adjuster member, the adjuster member configured to move the support member in the axial direction and to adjust a braking force.

13. The dual-bearing reel according to claim 9, wherein the coupling wall further includes a second lateral surface, the second lateral surface being on an opposite side of the coupling wall from the first lateral surface in an axial direction of the spool, and
   the first lateral surface is angled such that an outer peripheral portion of the first lateral surface is closer to the at least one magnet than an inner peripheral portion of the first lateral surface in the axial direction of the spool.

14. The dual-bearing reel according to claim 13, wherein a thickness of the coupling wall tapers in the axial direction of the spool, the thickness of the coupling wall increasing from an inner peripheral side of the coupling wall to an outer peripheral side of the coupling wall.

15. The dual-bearing reel according to claim 9, wherein a thickness of the coupling wall is thicker at an outer peripheral portion of the coupling wall than at an inner peripheral portion of the coupling wall.

* * * * *